(12) United States Patent
Kim et al.

(10) Patent No.: US 11,427,106 B2
(45) Date of Patent: Aug. 30, 2022

(54) VEHICLE FOR DISTRIBUTING CURRENT LOAD IN CONSIDERATION OF STATE OF HEALTH AND CONTROL METHOD THEREOF

(71) Applicants: Hyundai Motor Company, Seoul (KR); Kia Motors Corporation, Seoul (KR)

(72) Inventors: Sung Un Kim, Yongin-si (KR); Cheon Maeng, Yongin-si (KR); Young Ki Kim, Gunpo-si (KR); Jae Yong Lee, Chungju-si (KR); Sungjin Choi, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 229 days.

(21) Appl. No.: 16/704,310

(22) Filed: Dec. 5, 2019

(65) Prior Publication Data
US 2020/0282861 A1 Sep. 10, 2020

(30) Foreign Application Priority Data
Mar. 5, 2019 (KR) .......................... 10-2019-0024995

(51) Int. Cl.
*H02J 7/00* (2006.01)
*H02J 7/14* (2006.01)
*B60L 58/16* (2019.01)
*B60L 58/22* (2019.01)

(52) U.S. Cl.
CPC .............. *B60L 58/16* (2019.02); *B60L 58/22* (2019.02); *H02J 7/005* (2020.01); *H02J 7/0014* (2013.01)

(58) Field of Classification Search
CPC . B60L 58/16; B60L 58/22; H02J 7/005; H02J 7/0014
USPC ......................................................... 320/109
See application file for complete search history.

(56) References Cited

U.S. PATENT DOCUMENTS

| 2004/0230376 | A1* | 11/2004 | Ichikawa | G01C 21/26 702/2 |
| 2009/0174538 | A1* | 7/2009 | Shibata | B60K 6/48 340/438 |
| 2010/0114798 | A1* | 5/2010 | Sirton | B60L 53/665 705/412 |
| 2012/0059526 | A1* | 3/2012 | Maini | G06Q 30/018 700/291 |
| 2012/0319652 | A1* | 12/2012 | Namou | H02J 1/108 320/116 |

(Continued)

FOREIGN PATENT DOCUMENTS

| JP | 2015-215169 A | 12/2015 |
| KR | 10-2016-0094229 A | 8/2016 |

(Continued)

*Primary Examiner* — Alexis B Pacheco
(74) *Attorney, Agent, or Firm* — Morgan, Lewis & Bockius LLP

(57) ABSTRACT

A vehicle includes: a battery pack including a plurality of battery cells connected in parallel; and a controller configured to distribute a current load having a magnitude proportional to a state of health (SOH) of each of the plurality of battery cells to each of the plurality of battery cells, and to control the charging and discharging of each of the plurality of battery cells according to the magnitude of the distributed current load.

13 Claims, 4 Drawing Sheets

(56) References Cited

U.S. PATENT DOCUMENTS

| | | | |
|---|---|---|---|
| 2012/0319653 A1* | 12/2012 | Kumar | H02J 7/0026 |
| | | | 320/118 |
| 2013/0099754 A1 | 4/2013 | Ko | |
| 2014/0077731 A1* | 3/2014 | Kuwano | B60L 53/14 |
| | | | 320/126 |
| 2016/0105039 A1 | 4/2016 | Jeon et al. | |
| 2016/0118830 A1 | 4/2016 | Jeon et al. | |
| 2016/0134160 A1* | 5/2016 | Schultz | H02J 7/0019 |
| | | | 307/66 |
| 2016/0226269 A1 | 8/2016 | Hwang et al. | |
| 2018/0170207 A1* | 6/2018 | Ko | H01M 10/6563 |
| 2018/0257507 A1* | 9/2018 | Kawai | B60L 58/20 |
| 2019/0245381 A1* | 8/2019 | Sole | H02J 13/00 |
| 2019/0389314 A1* | 12/2019 | Zhu | B60L 53/11 |

FOREIGN PATENT DOCUMENTS

| | | |
|---|---|---|
| KR | 10-2017-0045140 A | 4/2017 |
| KR | 10-2018-0038822 A | 4/2018 |
| KR | 10-2018-0049545 A | 5/2018 |

* cited by examiner

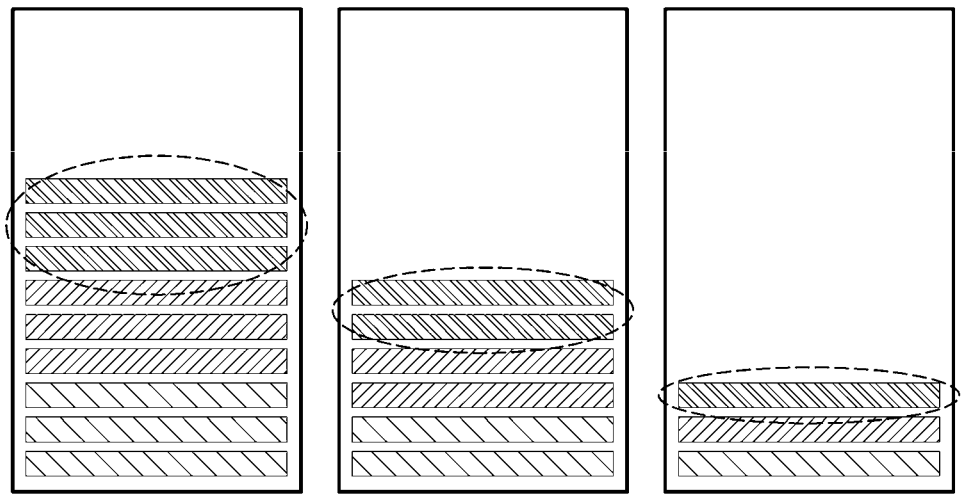
FIG. 2A CHARGING
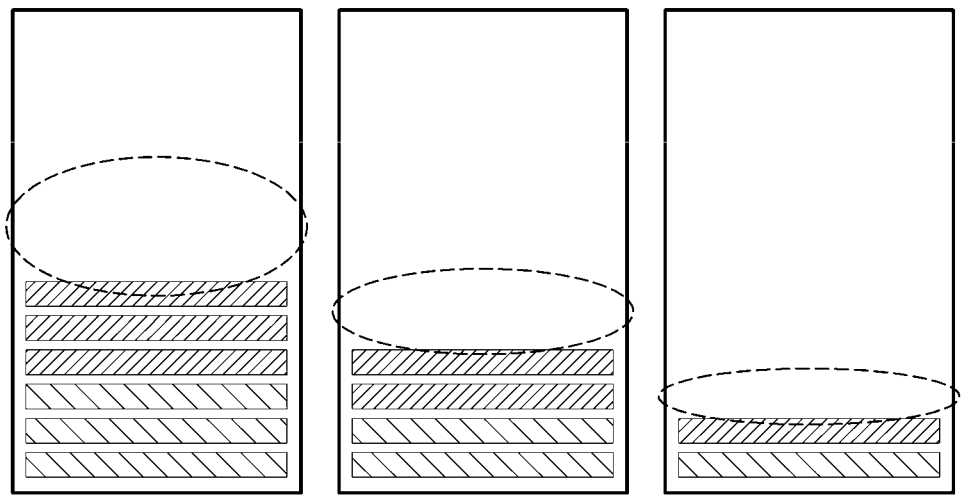
FIG. 2B DISCHARGING

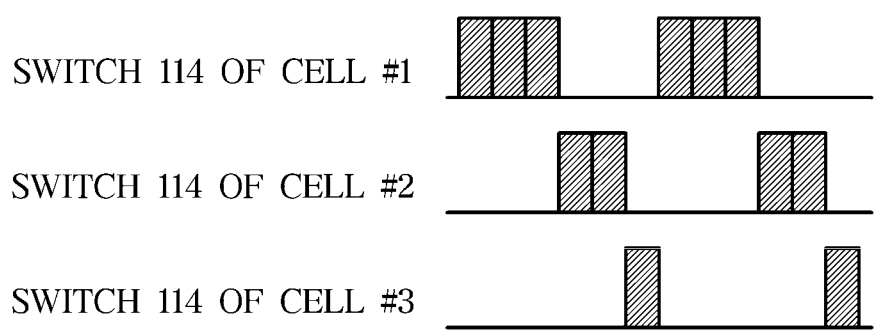
FIG. 3A PWM CONTOL
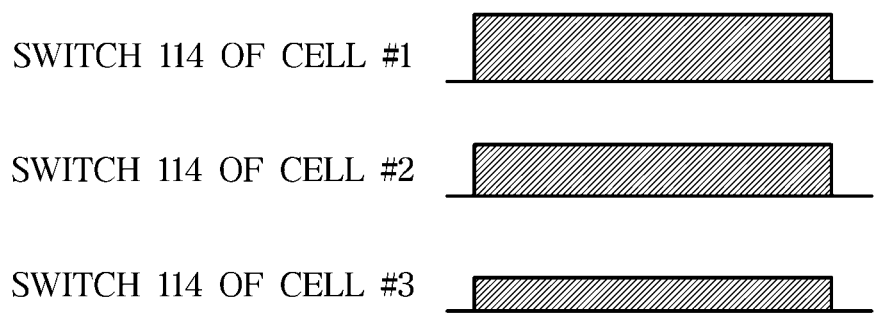
FIG. 3B GAIN CONTROL

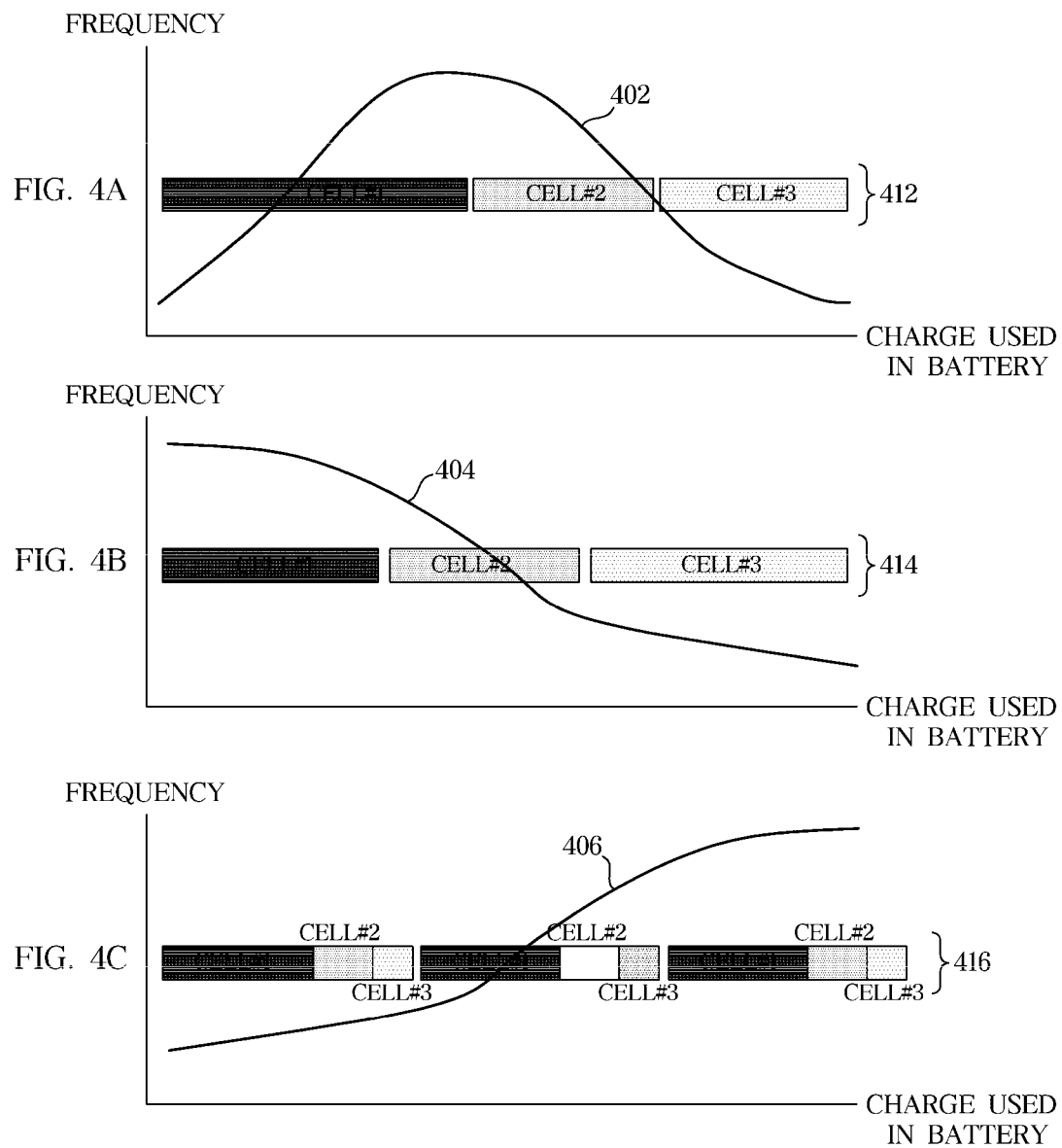

VEHICLE FOR DISTRIBUTING CURRENT LOAD IN CONSIDERATION OF STATE OF HEALTH AND CONTROL METHOD THEREOF

CROSS-REFERENCE TO RELATED APPLICATION(S)

This application is based on and claims priority to Korean Patent Application No. KR10-2019-0024995, filed on Mar. 5, 2019 in the Korean Intellectual Property Office, the disclosure of which is incorporated herein by reference.

TECHNICAL FIELD

The present disclosure relates to a vehicle, and more particularly, to a vehicle equipped with a battery and a control method thereof.

BACKGROUND

A battery for a vehicle is configured in the form of a battery pack in which a plurality of battery cells is connected in parallel for the purpose of increasing the capacity. A battery management system (BMS) manages the charging, discharging, and lifetime (health) of the battery. Further, the battery management system manages over-discharge and overcharge of each of the plurality of battery cells constituting the battery. The battery management system also performs current control for collectively charging or discharging the plurality of parallel-connected battery cells.

However, when the battery is charged or discharged, the battery management system performs charging control or discharging control based only on a state of charge (SOC) of the battery cells, so that some battery cells among the plurality of battery cells are aged faster than the other battery cells. Such aging of some of the battery cells may result in a loss of the total capacity of the battery pack.

SUMMARY

According to an aspect of the present disclosure, by distributing a current load in consideration of a state of health (SOH) of each of a plurality of battery cells constituting a battery pack, it is possible to minimize unevenness of the state of health of each of the plurality of battery cells, and to minimize the loss of the total capacity of the battery pack.

It is an aspect of the present disclosure to provide a vehicle including: a battery pack including a plurality of battery cells connected in parallel; and a controller configured to distribute a current load having a magnitude proportional to a state of health (SOH) of each of the plurality of battery cells to each of the plurality of battery cells, and to control charging and discharging of each of the plurality of battery cells according to the magnitude of the distributed current load.

The controller, in addition to the SOH of each of the plurality of battery cell, further considers a current consumption pattern of the battery pack to determine the magnitude of the current load.

The current consumption pattern of the battery pack reflects a driving propensity of a driver of the vehicle.

The controller limits the number of times of electrical current load bearing of each of the plurality of battery cells to one time during a single charge cycle or during a single discharge cycle.

The controller controls the number of times of electrical current load bearing of each of the plurality of battery cells to be repeated two or more times during a single charging cycle or during a single discharge cycle.

The vehicle further includes a plurality of switches arranged on a charge/discharge path of each of the plurality of battery cells to perform electrical conduction and electrical interruption of current flowing to each of the plurality of battery cells.

The controller controls an electric power transfer time of each of the plurality of battery cells by ON/OFF control of each of the plurality of switches so that an amount of current is proportional to the magnitude of the distributed current load.

The controller controls an amplitude of current flowing to each of the plurality of battery cells by a gain control of each of the plurality of switches so that an amount of current is proportional to the magnitude of the distributed current load.

It is another aspect of the present disclosure to provide a method of controlling a vehicle having a battery pack including a plurality of battery cells connected in parallel, the method including: receiving, by a controller, information of a state of health (SOH) of each of the plurality of battery cells; and distributing, by the controller, a current load having a magnitude proportional to the SOH of each of the plurality of battery cells to each of the plurality of battery cells, and controlling charging and discharging of each of the plurality of battery cells according to the magnitude of the distributed current load.

The method further includes a consideration of a current consumption pattern of the battery pack to determine the magnitude of the current load.

The current consumption pattern of the battery pack reflects a driving propensity of a driver of the vehicle.

The method includes a limitation of the number of times electrical current load bearing of each of the plurality of battery cells to one time during a single charge cycle or during a single discharge cycle.

The method includes controlling the number of times of electrical current load bearing of each of the plurality of battery cells to be repeated two or more times during a single charging cycle or during a single discharge cycle.

A plurality of switches may be arranged on a charge/discharge path of each of the plurality of battery cells to perform electrical conduction and electrical interruption of current flowing to each of the plurality of battery cells.

The method includes controlling an electric power transfer time of each of the plurality of battery cells by ON/OFF control of each of the plurality of switches so that an amount of current is proportional to the magnitude of the distributed current load.

The method includes controlling an amplitude of current flowing to each of the plurality of battery cells by a gain control of each of the plurality of switches so that an amount of current is proportional to the magnitude of the distributed current load.

It is yet another aspect of the present disclosure to provide a vehicle including: a battery pack including a plurality of battery cells connected in parallel; and a controller configured to distribute a current load having a magnitude determined based on at least one of a state of health (SOH) of each of the plurality of battery cells and a current consumption pattern of the battery pack to each of the plurality of battery cells, and to control charging and discharging of each of the plurality of battery cells according to the magnitude of the distributed current load.

It is yet another aspect of the present disclosure to provide a vehicle including: a battery pack including a plurality of battery cells connected in parallel and having a plurality of switches arranged on a charge/discharge path of each of the plurality of battery cells to control current flowing to each of the plurality of battery cells; and a controller configured to distribute a current load having a magnitude proportional to a state of health (SOH) of each of the plurality of battery cells to each of the plurality of battery cells, to control charging and discharging of each of the plurality of battery cells according to the magnitude of the distributed current load, and to control at least one of an electric power transfer time of each of the plurality of battery cells and an amplitude of current flowing to the plurality of battery cells by at least one of ON/OFF control and a gain control of each of the plurality of switches so that an amount of current is proportional to the magnitude of the distributed current load.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 2A and 2B are views illustrating battery management in charging and discharging states, respectively, based on a state of health (SOH) of a plurality of battery cells constituting a battery pack.

FIGS. 3A and 3B are views illustrating a switch control method of the battery pack in a PWM control mode and a gain control mode, respectively, shown in FIG. 1.

FIGS. 4A, 4B, and 4C are views illustrating a distribution strategy of charging/discharging a current load of a battery pack of a vehicle according to an exemplary embodiment of the present disclosure.

DETAILED DESCRIPTION

Figure 1:
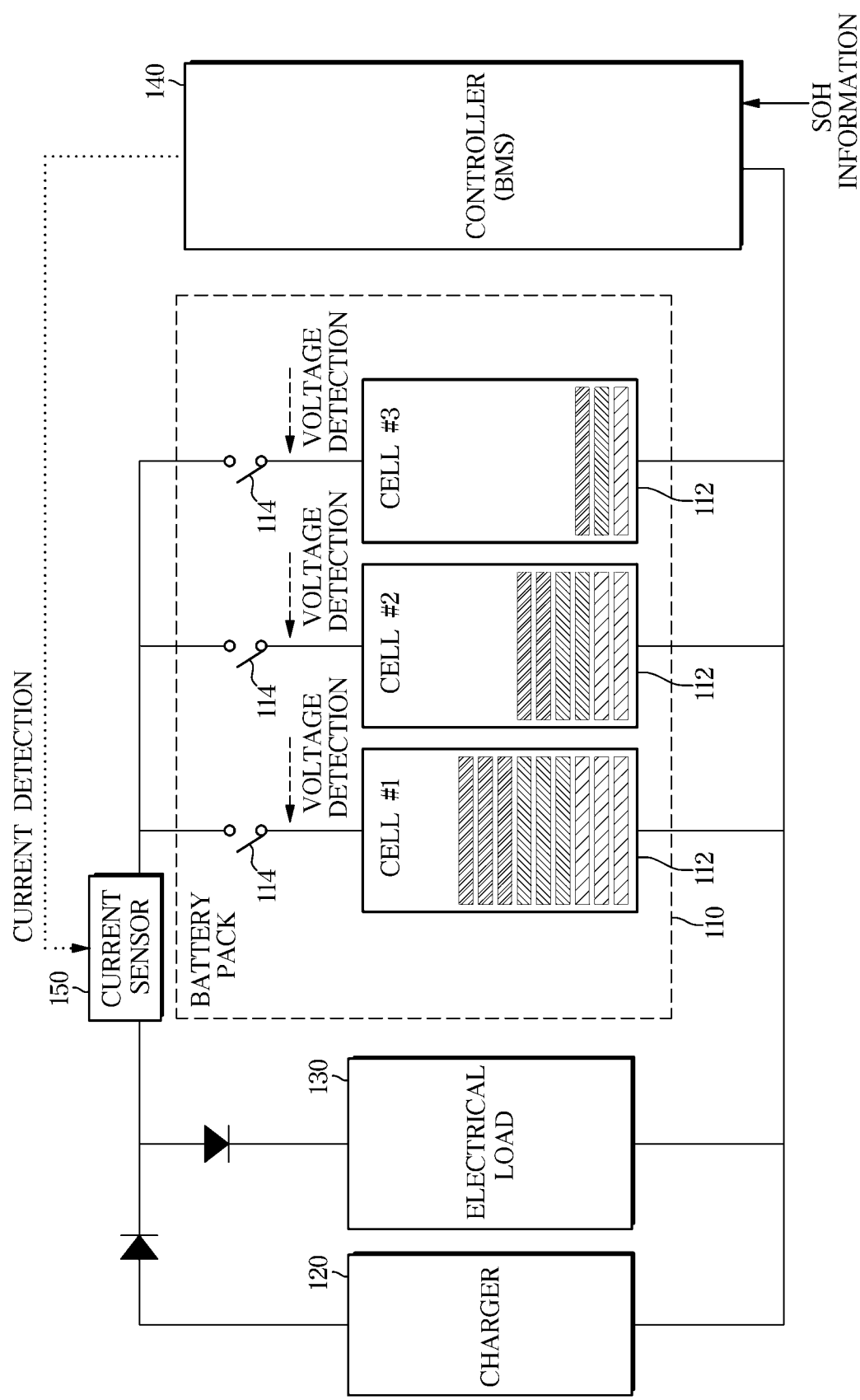
FIG. 1 is a view illustrating a battery pack control system of a vehicle according to an exemplary embodiment of the present disclosure.

FIG. 1 is a view illustrating a battery pack control system of a vehicle according to an exemplary embodiment of the present disclosure.

A battery pack 110 has a structure in which a plurality of battery cells 112 are connected in parallel. The plurality of battery cells 112 can increase the charging capacity of the battery pack 110 through the parallel-connected structure. Due to the parallel-connected structure of the plurality of battery cells 112, the charging and discharging of each of the plurality of battery cells 112 can be controlled independently. For this purpose, a switch 114 is arranged for each charging path of each of the plurality of battery cells 112. The switch 114 may be a field effect transistor (FET) or a bipolar junction transistor (BJT).

The battery pack 110 is charged through a charger 120. The charger 120 may be a charger provided outside the vehicle or a generator-type charger provided inside the vehicle. The charged battery pack 110 supplies electric power to an electrical load 130 of the vehicle.

A controller 140 controls the overall charging operation of the battery pack 110. The controller 140 may be a battery management system (BMS), or the controller 140 may be an electronic control unit (ECU) in the battery management system.

The controller 140 detects an amount of current supplied from the charger 120 to the battery pack 110 by a current sensor 150. The controller 140 also detects voltages of the plurality of battery cells 112. The controller 140 independently controls each of the plurality of switches 114 based on the detection result of the current and the voltages so that charging or discharging of each of the battery cells 112 is performed independently. In addition, the controller 140 performs battery management for preventing overcharge, over-discharge, and overcurrent from being applied to or discharged from each of the plurality of battery cells 112 of the battery pack 110. The controller 140 acquires and refers to information on a state of health (SOH) of each of the plurality of battery cells 112 for the battery management. The battery management of the controller 140 will be described in more detail with reference to FIGS. 2A and 2B.

The controller 140 controls the charging or discharging of each of the plurality of battery cells 112 by at least one of i) a method of ON/OFF control of the plurality of switches 114 in a PWM control (time division division) and ii) a method of controlling gains of each of the plurality of switches 114. The control of the switch 114 of the controller 140 will be described in more detail with reference to FIGS. 3A and 3B.

FIGS. 2A and 2B are views illustrating battery management based on a state of health (SOH) of a plurality of battery cells constituting a battery pack in charging or discharging states, respectively. FIG. 2A shows a case of charging the plurality of battery cells 112, and FIG. 2B shows a case of discharging the plurality of battery cells 112.

The state of health (SOH) of each of the plurality of battery cells 112 can be obtained from a ratio of 'a decreased value' to 'an initial value' of a charging capacity or the discharging capacity of each of the plurality of battery cells 112. Alternatively, the state of health (SOH) of each of the plurality of battery cells 112 can be obtained through direct current internal resistance (DCIR) which can be obtained by a ratio of the voltage and the current at the time of the charging/discharging.

As shown in FIGS. 2A and 2B, the controller 140 controls the charging/discharging of each of the plurality of battery cells 112 with different amounts of current according to the state of health (SOH) of each of the plurality of battery cells 112. For example, when a ratio of the SOHs of CELL #1, CELL #2, and CELL #3 is 80:50:20, the controller 140 assigns a weight proportional to the SOH, and adjusts an amount of charge current to each of the plurality of battery cells 112 at the ratio of 80:50:20.

FIGS. 3A and 3B are views illustrating a switch control method of the battery pack in a PWM control mode and a gain control mode, respectively, shown in FIG. 1. That is, as described in FIGS. 2A and 2B, the controller 140 controls the plurality of switches 114 to adjust the amount of current by giving a weight proportional to the SOH to each of the plurality of battery cells 112, as follows.

FIG. 3A shows a method of adjusting an electric power transfer time by the ON/OFF control of the plurality of switches 114. As shown in FIG. 3A, by appropriately adjusting ON/OFF times of each of the plurality of switches 114, the electric power transfer time of each of the plurality of switches 114 is adjusted, and the ratio of an amount of current at the time of the charging/discharging can be adjusted by the adjusting the electric power transfer time. In this case, the gains of each of the plurality of switches 114 can be fixed to a single value. That is, when the plurality of battery cells 112 are divided into the CELL #1, the CELL #2 and the CELL #3, and when each of the CELL #1, the CELL #2 and the CELL #3 is to be charged/discharged at a ratio of 8:5:2, the charging/discharging at a proper ratio (for example, 8:5:2 ratio) suitable for the situation of each of the plurality of battery cells 112 can be performed by variable control of a turn-on time (pulse width)(at 8:5:2 ratio) of each of the switches 114 of the CELL #1, the CELL #2, and the CELL #3.

FIG. 3B shows a method of controlling the gains of the plurality of switches 114. As shown in FIG. 3B, by appropriately adjusting the gains of each of the plurality of switches 114, an amplitude of current of each of the plurality of switches 114 is adjusted, and the ratio of an amount of current at the time of the charging/discharging can be adjusted by adjusting the amplitude of current. In this case, a state of each of the plurality of switches 114 can be fixed to one of an ON/OFF state. That is, when the plurality of battery cells 112 are divided into the CELL #1, the CELL #2 and the CELL #3, and when each of the CELL #1, the CELL #2 and the CELL #3 is to be charged/discharged at the ratio of 8:5:2, the charging/discharging at a proper ratio (for example, 8:5:2 ratio) suitable for the situation of each of the plurality of battery cells 112 can be performed by variable control of the gains (at 8:5:2 ratio) of each of the switches 114 of the CELL #1, the CELL #2, and the CELL #3.

FIGS. 4A, 4B, and 4C are views illustrating a distribution strategy of charging/discharging a current load of a battery pack of a vehicle according to an exemplary embodiment of the present disclosure. Particularly, FIGS. 4A, 4B, and 4C show the frequency of charge used until the battery pack 110 is recharged after the power of the battery pack 110 is consumed. Current consumption patterns 402, 404 and 406 of the battery pack 110 (as shown by the curved lines 402, 404, and 406 in FIGS. 4A, 4B and 4C) may be in various forms depending on the driving propensity of a driver. The controller 140 verifies the current consumption patterns 402, 404 and 406 of the battery pack 110 according to the operation propensity of the driver by storing current consumption values of the battery pack 110 in a memory and categorizing the current values. The controller 140 sets the current charging/discharging time distribution between the plurality of battery cells 112 differently according to the current consumption patterns 402, 404, and 406 (i.e., by varying the magnitude of current loads 412, 414 and 416) in which the driving tendency of the driver is reflected, in order to minimize the capacity loss of each of the plurality of battery cells 112 due to aging of the plurality of battery cells 112.

In the case of FIGS. 4A and 4B, a current load is sequentially distributed to each of the CELL #1, the CELL #2, and the CELL #3 constituting the plurality of battery cells 112, and the number times of electrical current load bearing times of each of the CELL #1, the CELL #2 and the CELL #3 is limited to one time during the single charging or the single discharging of one cycle. That is, as shown in FIGS. 4A and 4B, each of the plurality of battery cells 112 is given an order to distribute the current loads in a given order, and by varying a weight of the charge/discharge based on the SOH of each of the plurality of battery cells 112, the effect on the aging of each of the battery cells 112 is differentiated. For example, an order of the CELL #1-the CELL #2-the CELL #3 is assigned to each of the plurality of battery cells 112, and each of the plurality of battery cells 112 is corresponded to the current load in the order in which they are assigned. In addition, it is preferable to vary the weight of the charge/discharge of each of the plurality of battery cells 112 based on the SOH of the plurality of battery cells 112. For example, as shown in FIG. 4A, when the SOH of each of the CELL #1, the CELL #2, and the CELL #3 constituting the plurality of battery cells 112 is 50%, 30%, and 30%, the current load ratio of the CELL #1, the CELL #2, and the CELL #3 is also distributed at 50:30:30. Alternatively, as shown in FIG. 4B, when the SOH of each of the CELL #1, the CELL #2, and the CELL #3 constituting the plurality of battery cells 112 is 30%, 30%, and 50%, the current load ratio of each of the CELL #1, the CELL #2 and the CELL #3 is also distributed at 30:30:50.

In the case of FIG. 4C, the current load is sequentially distributed to each of the CELL #1, the CELL #2, and the CELL #3 constituting the plurality of battery cells 112, and the number of current load bearing times of each of the CELL #1, the CELL #2 and the CELL #3 is at least two during the charging/discharging of one cycle. That is, as shown in FIG. 4C, each of the plurality of battery cells 112 is given an order to distribute the current loads in a given order, and by varying the weight of the charge/discharge based on the SOH of each of the plurality of battery cells 112, the effect on the aging of each of the battery cells 112 is differentiated. For example, an order of the CELL #1-the CELL #2-the CELL #3 is assigned to each of the plurality of battery cells 112, each of the plurality of battery cells 112 is corresponded to the current load in the order in which they are assigned, and the number of current load bearing times of each of the CELL #1, the CELL #2 and the CELL #3 is at least two during the charging/discharging of one cycle. In addition, it is preferable to vary the weight of the charge/discharge of each of the plurality of battery cells 112 based on the SOH of the plurality of battery cells 112. For example, as shown in FIG. 4A, when the SOH of each of the CELL #1, the CELL #2, and the CELL #3 constituting the plurality of battery cells 112 is 80%, 50%, and 20%, the current load ratio of the CELL #1, the CELL #2, and the CELL #3 is also distributed at 80:50:20.

The above description of the present disclosure is for illustrative purposes, and a person having ordinary skill in the art should appreciate that other specific modifications may be easily made without departing from the technical spirit or essential features of the present disclosure. Therefore, the above embodiments should be regarded as illustrative rather than limitative in all aspects. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:
1. A vehicle comprising:
a battery pack including a plurality of battery cells connected in parallel;
a plurality of switches arranged on a charge/discharge path of each of the plurality of battery cells to perform electrical conduction and electrical interruption of current flowing to each of the plurality of battery cells; and
a controller configured to:
distribute a current load having a magnitude proportional to a state of health (SOH) of each of the plurality of battery cells to each of the plurality of battery cells, and
control charging and discharging of each of the plurality of battery cells according to the magnitude of the distributed current load,
wherein the controller controls an amplitude of current flowing to each of the plurality of battery cells by a gain control of each of the plurality of switches so that an amount of current is proportional to the magnitude of the distributed current load.

2. The vehicle according to claim 1, wherein the controller determines the magnitude of the current load based on a current consumption pattern of the battery pack and the SOH of each of the plurality of battery cells.

3. The vehicle according to claim 2, wherein the current consumption pattern of the battery pack reflects a driving propensity of a driver of the vehicle.

4. The vehicle according to claim 2, wherein the controller limits the number of times of electrical current load bearing of each of the plurality of battery cells to one time during a single charge cycle or during a single discharge cycle.

5. The vehicle according to claim 2, wherein the controller controls the number of times of electrical current load bearing of each of the plurality of battery cells to be two or more times during a single charging cycle or during a single discharge cycle.

6. The vehicle according to claim 1, wherein the controller controls an electric power transfer time of each of the plurality of battery cells by an ON/OFF control of each of the plurality of switches so that an amount of current is proportional to the magnitude of the distributed current load.

7. A method of controlling a vehicle having a battery pack which includes a plurality of battery cells connected in parallel, and a plurality of switches are arranged on a charge/discharge path of each of the plurality of battery cells to perform electrical conduction and electrical interruption of current flowing to each of the plurality of battery cells, the method comprising:
  receiving, by a controller, information of a state of health (SOH) of each of the plurality of battery cells; and
  distributing, by the controller, a current load having a magnitude proportional to the SOH of each of the plurality of battery cells to each of the plurality of battery cells, and controlling charging and discharging of each of the plurality of battery cells according to the magnitude of the distributed current load,
  wherein the controller controls an amplitude of current flowing to each of the plurality of battery cells by gain control of each of the plurality of switches so that an amount of current is proportional to the magnitude of the distributed current load.

8. The method according to claim 7, wherein the controller determines the magnitude of the current load based on a current consumption pattern of the battery pack and the SOH of each of the plurality of battery cells.

9. The method according to claim 8, wherein the current consumption pattern of the battery pack reflects a driving propensity of a driver of the vehicle.

10. The method according to claim 8, wherein the controller limits the number of times of electrical current load bearing of each of the plurality of battery cells to one time during a single charge cycle or during a single discharge cycle.

11. The method according to claim 8, wherein the controller controls the number of times of electrical current load bearing of each of the plurality of battery cells to be two or more times during a single charging cycle or during a single discharge cycle.

12. The method according to claim 7, wherein the controller controls an electric power transfer time of each of the plurality of battery cells by ON/OFF control of each of the plurality of switches so that an amount of current is proportional to the magnitude of the distributed current load.

13. A vehicle comprising:
  a battery pack including a plurality of battery cells connected in parallel and having a plurality of switches arranged on a charge/discharge path of each of the plurality of battery cells to control current flowing to each of the plurality of battery cells; and
  a controller configured to:
    distribute a current load having a magnitude proportional to a state of health (SOH) of each of the plurality of battery cells to each of the plurality of battery cells,
    control charging and discharging of each of the plurality of battery cells according to the magnitude of the distributed current load, and
  control at least one of an electric power transfer time of each of the plurality of battery cells and an amplitude of current flowing to the plurality of battery cells by at least one of ON/OFF control and gain control of each of the plurality of switches so that an amount of current is proportional to the magnitude of the distributed current load.

* * * * *